United States Patent [19]

Phillips

[11] Patent Number: 5,651,678
[45] Date of Patent: Jul. 29, 1997

[54] EDUCATIONAL READING AID AND METHOD FOR USING SAME

[75] Inventor: Peter Phillips, Mt. Vernon, N.Y.

[73] Assignee: Phillips Associates, Inc., Mt. Vernon, N.Y.

[21] Appl. No.: 172,884

[22] Filed: Dec. 23, 1993

[51] Int. Cl.⁶ .................. G09B 17/00; G09B 1/00
[52] U.S. Cl. .............. 434/170; 434/178; 434/176
[58] Field of Search .................. 434/178, 184, 434/167, 170, 172, 179, 176

[56] References Cited

U.S. PATENT DOCUMENTS

| | | |
|---|---|---|
| 78,296 | 5/1868 | Leigh . |
| 146,631 | 1/1874 | Allen . |
| 364,845 | 6/1887 | Oakley . |
| 683,267 | 9/1901 | Froehlich .................. 434/170 |
| 1,603,129 | 10/1926 | McDade . |
| 1,732,980 | 10/1929 | Mooney . |
| 2,361,154 | 10/1944 | Schoolfield . |
| 2,369,804 | 2/1945 | Schoolfield et al. . |
| 2,524,143 | 10/1950 | Smith . |
| 2,538,085 | 1/1951 | Cotton . |
| 3,170,247 | 2/1965 | Kovacevich . |
| 3,571,951 | 3/1971 | Siegal et al. . |
| 3,618,231 | 11/1971 | Nason . |
| 3,715,812 | 2/1973 | Novak . |
| 4,007,548 | 2/1977 | Cytanovich . |
| 4,151,659 | 5/1979 | Lien et al. . |
| 4,273,538 | 6/1981 | Ross .................. 434/178 |
| 4,397,635 | 8/1983 | Samuels .................. 434/178 |
| 4,398,891 | 8/1983 | King .................. 434/159 |
| 4,437,837 | 3/1984 | Schnettler et al. .................. 434/178 |
| 4,490,118 | 12/1984 | Stewart .................. 434/178 |
| 4,493,650 | 1/1985 | Kaufmann, III et al. .................. 434/178 |
| 4,609,357 | 9/1986 | Clegg .................. 434/167 |
| 4,640,512 | 2/1987 | Burke .................. 434/178 |
| 4,643,450 | 2/1987 | Morris .................. 434/178 |
| 4,655,713 | 4/1987 | Weiss .................. 434/178 |
| 5,057,020 | 10/1991 | Cytanovich .................. 434/178 |
| 5,336,093 | 8/1994 | Lox .................. 434/178 |

FOREIGN PATENT DOCUMENTS 1482915  8/1977  United Kingdom .................. 434/184

*Primary Examiner*—Todd E. Manahan
*Attorney, Agent, or Firm*—Curtis, Morris & Safford, PC

[57] ABSTRACT

An educational aid and a method for using it to teach students to read by facilitating the rapid development of extensive sight-word vocabularies in an interesting and challenging manner through the utilization of a student's natural ability to learn and memorize a text. The educational aid includes a notation system for a readable format text and reinforcement aids for the key words of the text. The method for using the educational aid accomplishes the rapid development of sight-word vocabularies, and requires a minimum of instruction and supervision from an educator.

11 Claims, 11 Drawing Sheets

Once upon a time, there were three bears: the Papa Bear, the Mama Bear, the Baby Bear. They lived in a house in the forest

FIG. 1

| Find Words | | |
|---|---|---|
| they | were | mama |
| the | in | time |
| bears | and | were |
| three | the | bear |
| in | three | there |

*FIG. 4*

| Name and Write Words | | | |
|---|---|---|---|
| and | _ _ _ | in | |
| bear | _ _ _ _ | mama | |
| bears | _ _ _ _ _ | papa | _ _ _ _ |
| baby | _ _ _ _ | the | _ _ _ |
| house | _ _ _ _ _ | three | _ _ _ _ _ |

*FIG. 5*

1. There was a house.   ←—— 122
2. There was a mama and a papa in the house.
3. The baby was there.
4. The house was there.
5. There were three bears.
6. Three bears were there.
7. The mama and the papa were there.

*FIG. 9*

EDUCATIONAL READING AID AND METHOD FOR USING SAME

BACKGROUND OF INVENTION

This invention relates to an educational aid and a method for using this system to facilitate the instruction of students to read. More particularly, the invention relates to an educational system and a method for using it to facilitate the rapid development of sight-word vocabularies.

The first step in teaching a student to read is developing a foundation of fundamental words which the student can recognize on sight and then expanding this foundation over time. Educational tools in the form of books, flash cards, rebus symbols, orthography, and other devices have been employed in the past. These educational tools are generally integrated into a teaching plan which requires active involvement of an educator. Generally, the educator employs a rote memorization technique in which the educator articulates the word and the student repeats the word aloud while viewing and trying to remember the written representation of the word. In this manner, the student memorizes the visual sight of the word together with its enunciation.

However, some students, especially children, have short attention spans. It is difficult for them to pay attention for an extended period during a laborious process of teaching by a rote memorization technique. Even though prior educational tools employ a variety of different methods and devices to help reinforce the newly learned words in the mind of the student, learning by rote memorization is still difficult and the student can lose interest. Therefore, prior methods make it difficult for the new student to recognize fundamental words on sight.

Recognizing that typical educational tools are tedious and unappealing, inventors developed different educational tools to increase the interest and attention span of students. One such educational tool is disclosed in U.S. Pat. No. 2,524,143, issued to W. D. Smith. The Smith patent discloses articulating words to a rhythmic or musical beat (e.g., a phonograph record) accompanied with corresponding text of these words. The text includes indicia marking each single syllable word or each syllable within a multiple syllable word. This indicia is used to indicate the natural rhythmic upbeats and downbeats to the words in common stories. However, the system is limited to use with rhythmic or musical beats which tends to focus the student's attention on the rhythmic beats through the story, not on the specific words in the story. Furthermore, the system requires a student to have a rather sophisticated grasp of music prior to using the system. Therefore, the system would not be useful for instructing younger children.

Another variation on the rote memorization technique is taught in U.S. Pat. No. 4,437,837, issued to Schnettler et al. The Schnettler et al. patent teaches the use of rebus indicia with high frequency words (i.e. the, in, a, and) and also the use of word cards as reinforcement material for the memorization of these high frequency words. Schnettler et al.'s use of rebus indicia and word cards may assist in keeping a student's attention but still requires extensive employment of rote memorization techniques wherein the educator articulates the words and the student repeats them in turn while viewing the visual representation of the word. The Schnettler et al. technique also has a fundamental limitation in its ability to expand as the student's vocabulary expands. Rebus indicia, such as cat, dog, wagon, house, etc., is only useful in teaching simple high frequency words. Thus, this system is only useful to lay the sight-word foundation for the first handful of words and loses its value when the student incorporates these simple nouns (dog, cat, etc.) into their sight-word vocabulary. Additionally, rebus indicia itself has a fundamental limitation in that, in general, it can only be used with monosyllabic words.

Other educational tools assist a more advanced reader. For example, the use of indicia for the syllabication of words is taught in U.S. Pat. No. 146,631, issued to C. Allen. The Allen patent teaches a method for designating and accentuating syllables with marks to facilitate instruction in reading. The Allen patent may be helpful in teaching pronunciation, enunciation and elocution. However, it does not lend itself to initial stages of learning to read by laying a foundation of fundamental words. The Allen patent also does not place the indicia on one syllable words to focus the student's attention on each individual word, nor does it teach a method for imprinting the words in the student's memory through the use of reinforcement material for the development of a sight-word vocabulary, as in the present invention.

The prior art suggests many ways to keep a student's attention while subjecting the reader to rote memorization techniques and many ways to assist the student's pronunciation of words. However, no system takes advantage of a student's, especially a child's, existing knowledge of certain simple texts, such as nursery rhymes, songs, poems, slogans or stories or that student's natural ability to rapidly learn and remember such a text without ever having learned to read that text. The natural ability to learn and to repeat this simple information can be utilized to build extensive sight-word vocabularies in a relatively short period of time.

It would be highly desirable to have an educational aid and a technique to facilitate rapid development of sight-word vocabularies in a challenging and interesting manner using the student's natural ability to hear and remember simple information such as songs, poems, slogans, rhymes, or stories without forcing rote word memorization techniques on the student.

SUMMARY OF THE INVENTION

It is a principle object of the invention to provide an educational aid and a method for using it to facilitate rapid development of sight-word vocabularies in an interesting and challenging manner.

A further object is to provide such an aid and method which requires a minimum of instruction and supervision from an educator.

Another object of the invention is to provide such an aid and method which utilizes a student's natural ability to hear and learn songs, poems, slogans, rhymes, or stories which are easily remembered.

The above and further objects of the invention are realized by providing an educational aid which includes an ordered group of instructional steps designed to require a minimum of instruction and supervision from an educator.

The first step takes advantage of a student's, especially a child's, existing knowledge of or the student's natural ability to rapidly learn simple songs, and the like. The educator selects simple information which is already known verbatim by the student or can be learned easily by the student by hearing and repeating the information. For example, there are nursery rhymes which are known to children because they have heard and repeated them during their childhood. Once the student can recite the simple information verbatim, the student can learn how to read with little or no assistance of a teacher.

The second step involves presenting this simple information in a format which can be read, such as a printed text on paper or a computer disk or chip which can be displayed on a computer screen, and which contains notations to visually separate and focus a student's attention on each word or syllable. These notations can be represented in a visual teaching system as visual cues within text or in melody maps as graphic notations on analog maps, or in any other related manner.

A visual tracking system includes visual cues placed with the text of the readable information. Each cue notes each word or each syllable of each word. As the student mentally or orally, articulates each word or syllable of the text from verbatim memory, rather than by reading, the student follows along each syllable or word in the printed text and keeps his place by noting or touching each succeeding cue. As the student carries out the exercise and articulates each syllable or word of the text, he will become familiar with the sound of the word or syllable and visualize the appearance of each word or syllable. This exercise can be repeated until the student builds a sight-word vocabulary.

Melody maps include visual aids which contain graphical representations depicting analog melody patterns. The melody maps are useful when the material learned in the first step is a song, such as a familiar children's song. These melody patterns are mapped with the up and down movement of each phrase in the song melody. Each successive word or syllable is enclosed in a discrete note oval or similar notation to focus the student's attention on each word or syllable. As the student points at each note oval to keep his place while mentally or orally articulating the song from verbatim memory, rather than by reading, the student will begin to associate the sound of the word or syllable with its appearance in print. Thereby, the student begins to build a sight-word vocabulary.

The melody map is, in general, analogous to the note differentiation of a musical staff. Thus, the melody map serves as a rudimentary musical notation which helps the student keep his place by following the sound differentiation while mentally or orally singing the song. This same rudimentary musical notation can be used to teach a student to read standard musical notation.

It is, of course, understood that various notations can be used to visually separate and focus a student's attention on each word or syllable in the lyrics of songs, rhymes, poems, slogans or story text which has been learned. Other notations include color indicia, word size differentiation, and the like.

A third step involves the use of interesting and challenging reinforcement materials relating directly to the simple information which the student can recite verbatim and which was presented in a readable format. These reinforcement materials are used by the student in conjunction with the readable format text containing the visual tracking system, the melody maps, or any other embodiment of the invention which focuses a student's attention on each word or syllable of the simple information. Each set of reinforcement materials may correspond to the key words of the specific song, rhyme, poem, slogan or story. The reinforcement materials are designed to allow the student to teach himself to read by building a sight-word vocabulary through his own efforts. The reinforcement materials can be supplied in a readable format like that of the text.

A word search exercise is one type of reinforcement technique to use together with the readable format text to build sight-word vocabularies. The word search exercise requires the student to step through the readable format text using the visual notations to find the word matching the word provided in the reinforcement material. By stepping through the readable format text to find the exercise word, the student articulates, mentally or orally, the song, rhyme, poem, slogan or story from memory, until he reaches the exercise word. At that point, he can correlate the sound of the word with the visual appearance of the word in both the readable format text and the reinforcement material.

Once the student gains some proficiency in correlating the sound of the word with its visual appearance, the student can use naming and writing exercises. The naming and writing exercise requires the student to recite the listed word and to write the letters of that word in the spaces provided further reinforcing the visual appearance of the word. If, while working through this exercise, the student does not recognize a word, he can use the readable format text to step through the corresponding text using the discrete note ovals or the visual cues to find the word in the story which matches the word in the reinforcement materials. This, in turn, requires the student to develop a strategy for remembering the appearance of that word, and leads to the rapid development of sight-word vocabularies. This exercise can be practiced by the student alone and without the intervention of an instructor.

In another reinforcement exercise, the student is supplied with a set of word cards or syllable cards to be used together with the readable format text, for example, to construct sentences and phrases or simply to enhance the student's reading ability of key words. Manipulation of the word cards and syllable cards motivates and reinforces learning. Again, if the student does not recognize a word or syllable, he can use, for example, the melody map, the visual tracking system, or similar notation system to step through the corresponding text using the discrete note ovals or the visual cues to find the word or syllable in the text which matches the word or syllable on the card.

This same exercise, as well as other described reinforcement exercises, can be used to identify and learn new words made up of a combination of syllables from words in the readable format text.

The reinforcement materials also include spelling exercises. The spelling exercises includes a set of cards containing letters from the alphabet and a representation of a portion of a word or a full word from the readable format text. The word portions can be represented on pre-printed pages or an educator can construct the word portion with the alphabet cards. The student selects the letter from the alphabet cards to complete the word. The full word can also be represented on preprinted pages or an educator can construct the full word with the alphabet cards. The student selects the letters from the alphabet cards to construct the word.

The reinforcement materials further include comprehension exercises. The comprehension exercises include sets of new sentences created from the key words which the student has now incorporated into his sight-word vocabulary. These new sentences promote the student's ability to read and use the newly learned key words in different sentence structures. Again, if the student does not recognize a word, he can refer to the readable format text to step through the corresponding text using the notations to find the word or syllable in the story which matches the corresponding word or syllable in the new sentences or to assist in comprehending the word meaning in the new sentence structure.

The reinforcement material format, used in conjunction with readable format text, requires the student to develop a strategy for remembering the appearance of each word. This, in turn, leads to the rapid development of sight-word vocabularies with minimal or no supervision from an educator.

The readable format text and the reinforcement exercises, if desired, can be specifically selected to accommodate a particular student. Text can be selected that is already known and of interest to the particular student. The readable format text and reinforcement materials can be selected to take into account the countless differences among students, such as differences in culture, language, age, reading proficiency, topic interest, degree of difficulty, etc.

The readable format text and corresponding reinforcement materials can be supplied together as a kit as hard copy in, for example, a book, newsletter or other printed medium or as part of a software package which, for example, can be displayed on a screen or printed by the student or educator.

BRIEF DESCRIPTION OF THE DRAWINGS

These and other features of the invention will become apparent, and the invention itself will be best understood, by reference to the following descriptive embodiments of the invention taken in conjunction with the accompanying drawings.

FIG. 1 represents an educational aid defined as a visual tracking system having a story text with indicia below the text.

FIG. 4 represents an educational reinforcement aid defined as a word search exercise.

FIG. 5 represents an educational reinforcement aid defined as a naming and writing exercise.

FIG. 9 represents an educational reinforcement aid defined as a comprehension exercise.

DETAILED DESCRIPTION OF THE INVENTION

The invention involves an educational aid for teaching students, particularly children (for example, 4–6 years old), to read. This educational aid utilizes a student's natural ability to recall information, such as simple songs, rhymes, and stories verbatim which can be easily memorized or which are already known by the student. The educational aid includes notations in readable format text to visually separate and focus a student's attention on each word or syllable in a readable format text, such as the lyrics of songs, rhymes, poems, slogans or story text. The readable format text can be provided in any suitable manner, such as print words on a card, paper or book or even as information on a computer chip or disk which then can be displayed in readable form on a screen in printed form. These notations can be represented as graphic notations on analog maps, visual cues within printed stories, and the like. The notated text is supplemented with reinforcement material, similar to word games.

The educational aid which includes the notated readable format text and reinforcement material allows the student to learn fundamental words recognizable on sight leading to rapid development of reading skills. All of the learning material in the educational aid requires little or no educator supervision once the song, rhyme, poem, slogan or story etc. is taught to or known by the student.

Referring to FIG. 1, there is shown an education aid referred to as a visual tracking system 10 for words and/or syllables. Visual cues 12 are placed within the readable format text 14 of a familiar lyric, rhyme, or story, etc. In this case, the text of FIG. 1 corresponds to the story of "Goldilocks and the Three Bears". These visual cues 12 can be any type of mark or color indicia in any size or shape which is above, below, around, or within the text to help focus the student's attention to each syllable or word. Each cue 12 denotes a syllable or word and helps the student keep his place by touching each succeeding cue 12 as he, mentally or orally, articulates the text 14 from verbatim memory rather than by reading. The visual cues 12 are preferably placed below the text 14 such that the student does not obscure the text 14 as he touches each succeeding cue 12 while articulating the text 14. It is also preferred that the visual cues 12 be less prominent than the text 14, such that the text 14 remains the focus of attention rather than the visual cue 12. FIG. 1 presents a gray-shaded, square visual cue 12 placed below the black printed text 14 at the beginning of each syllable or word. Thus, the student recites each word of the readable format text from memory while following along with each of these visual cues 12 thereby becoming familiar with both the sound and the visual appearance of the words and syllables. By repeating the exercise, the student will learn fundamental words which he can recognize on sight to develop his reading skills.

Figure 2:
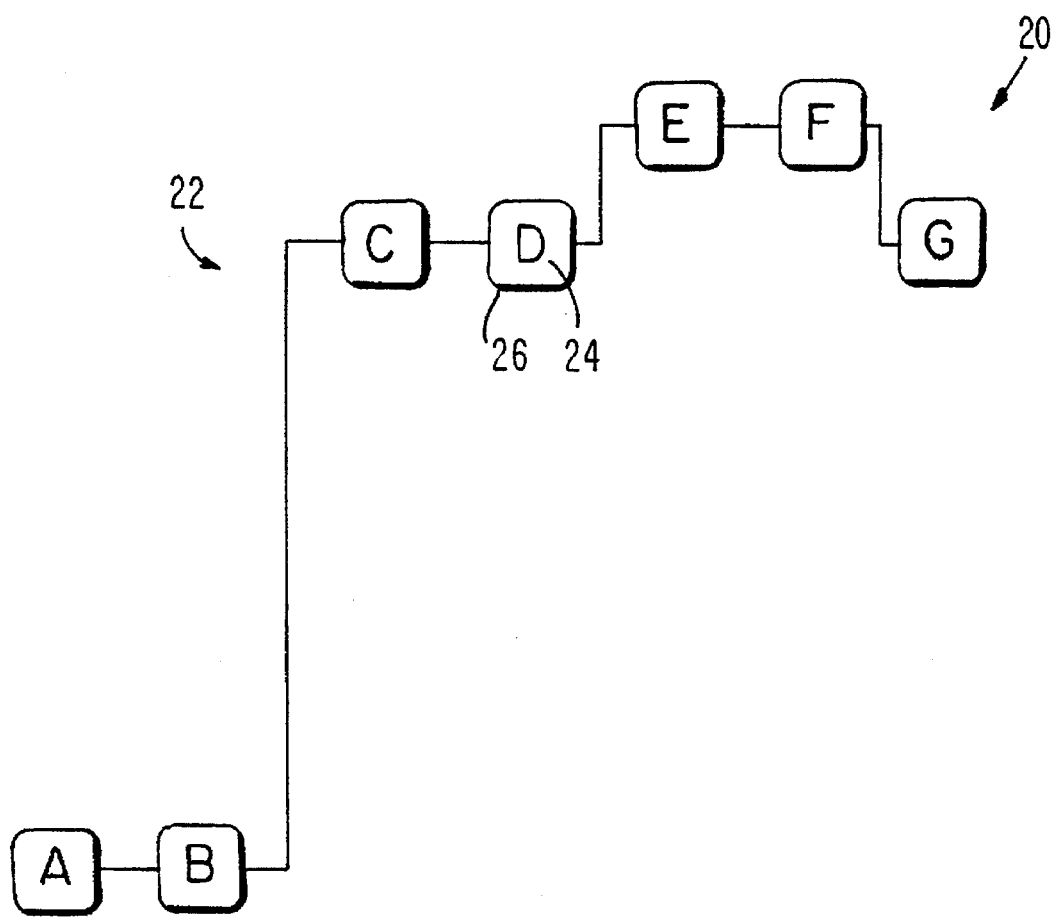
FIG. 2 represents an educational aid defined as a melody map with discrete note ovals.

Shown in FIG. 2 is an educational aid defined as a melody map. The melody map 20 consists of a visual aid which contains graphical representations depicting analog melody patterns 22. The melody map 20 is generally used when the verbatim learned material is a song, such as a familiar children's song. The analog melody pattern of FIG. 2 corresponds to "The Alphabet Song". The analog melody pattern 22 is mapped with the up and down movement of the song melody with each phrase. Each successive word or syllable 24 is preferably enclosed in a discrete note oval 26 to focus the student's attention on each word or syllable 24. These note ovals 26 can, of course, also be any type of mark or color indicia in any size or shape which is above, below, around, or within the text to help focus the student's attention to each syllable or one syllable word and show the up and down movement of the song melody. As the student points at each note oval 26 while mentally or orally articulating the song from verbatim memory rather than reading, the student will associate the sound of the word or syllable 24 with its appearance in print. Thereby, the student begins to build a sight-word vocabulary.

Figure 10:
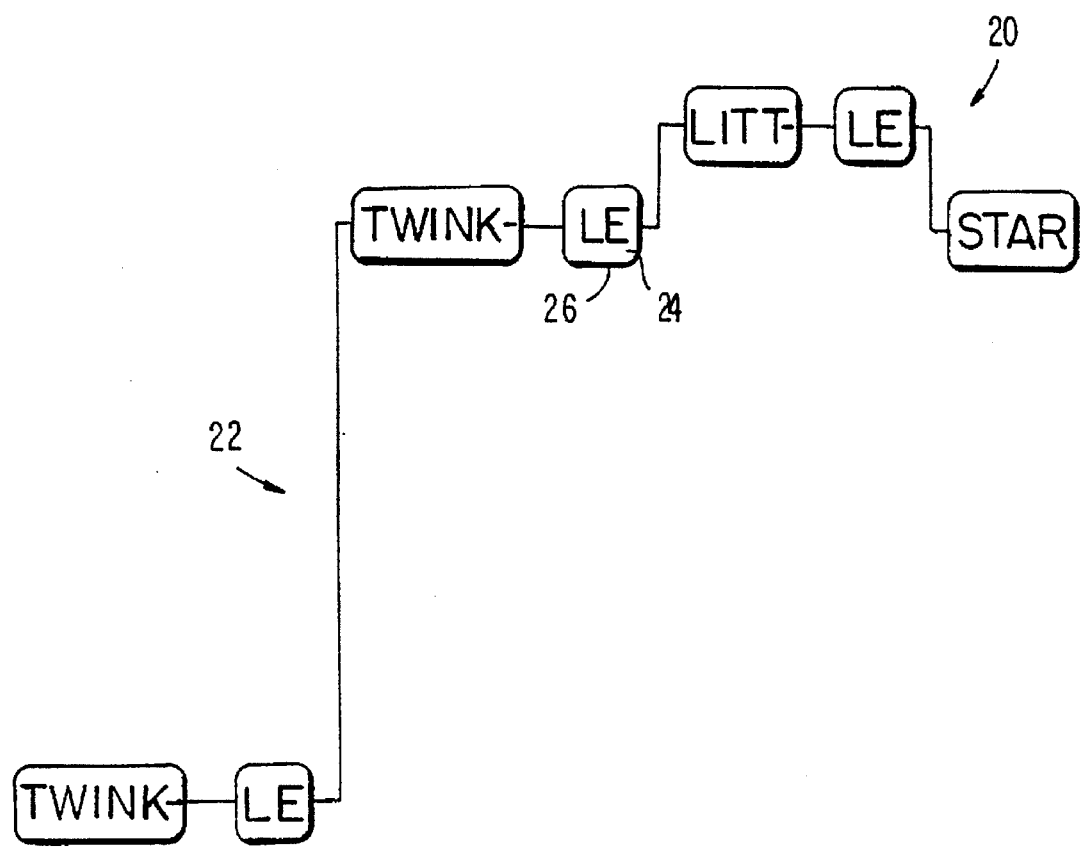
FIG. 10 represents an educational aid defined as a melody map with discrete note ovals using text from a children's song.
Figure 11A:
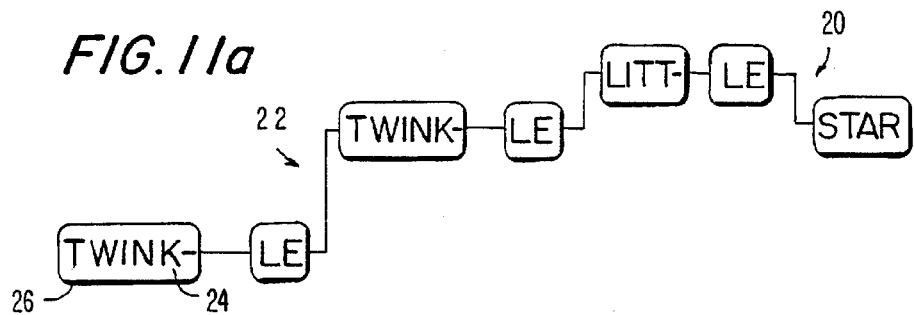
FIG. 11a–11d represent the transition of the melody map shown in FIG. 10 to full musical notation.
Figure 11B:
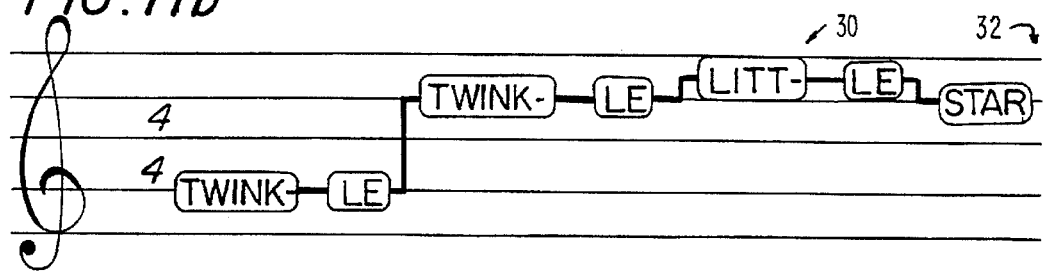
Figure 11C:
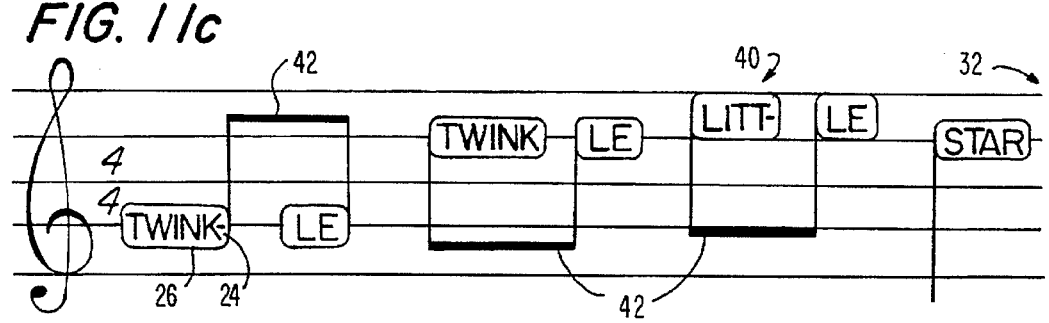
Figure 11D:
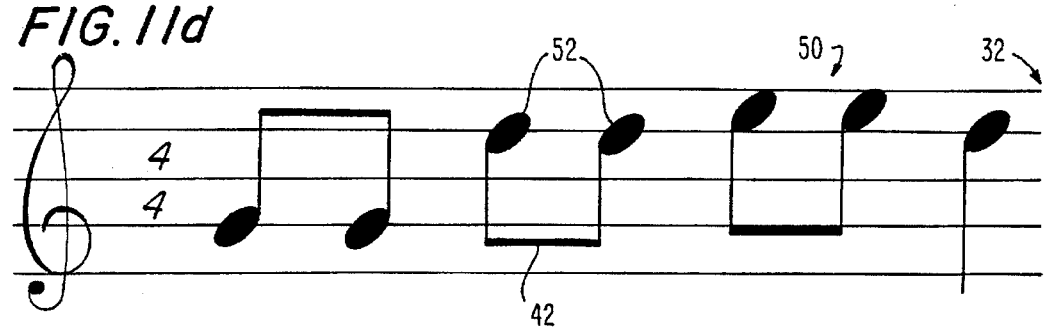

The analog melody pattern of FIG. 10 depicts the same technique of FIG. 2, but uses words and syllables 24 in the note ovals 26 corresponding to the children's song "Twinkle, Twinkle Little Star".

It is, of course, understood that a variety of notation systems can be used to visually separate and focus a student's attention on each word or syllable in the lyrics of songs, poems, rhymes, slogans or story text which has been learned. Other notation systems could include different colored letters, different word or syllable sizes, and the like.

The melody map 20 in FIG. 2 is, in general, analogous to the note differentiation of a musical staff. Thus, the melody map 20 serves also as a rudimentary musical notation which helps the student keep his place by following the sound differentiation while mentally or orally articulating the song. With further instruction, this same rudimentary musical notation can be used as a first step to teach a student to read standard musical notation.

Figure 3A:
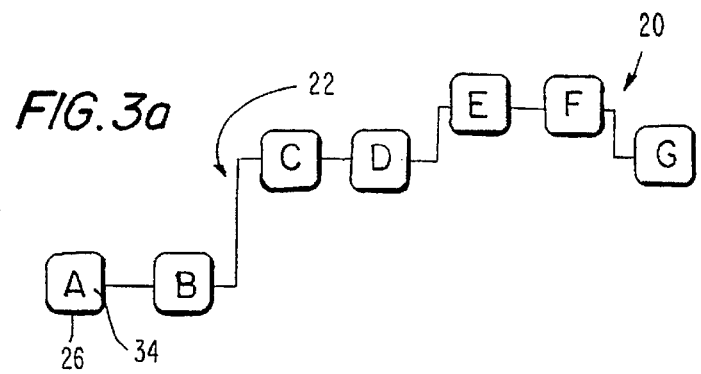
FIGS. 3a–3d represent the transition of the melody map shown in FIG. 2 to full musical notation.

FIGS. 3a–3d represent the sequential steps of teaching a student to read standard musical notation. FIG. 3a corresponds to the melody map 20 of FIG. 2. The student is taught the song with the rudimentary musical notations of each successive word or syllable 24 enclosed in a discrete note oval 26 or equivalent notation to focus the student's attention on note differentiation of each word or syllable 24.

Figure 3B:
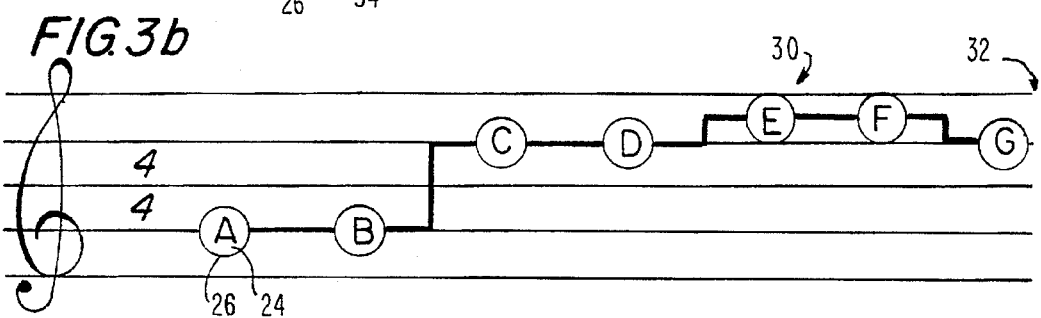

Referring to FIG. 3b, once the song is learned with the rudimentary melody map 20 of FIG. 3a, the student will shift to a scaled melody map 30, shown in FIG. 3b. The scaled melody map 30 overlays the rudimentary melody map 20 of FIG. 3a onto a musical staff 32. The scaled melody map 30 also includes each successive word or syllable 24 enclosed in a discrete note oval 26 to focus the student's attention on note differentiation of each word or syllable 24. However, now the student using the sound of each word or syllable 24 is also taught the relative position of the note for that sound on the standard musical staff 32.

Figure 3C:
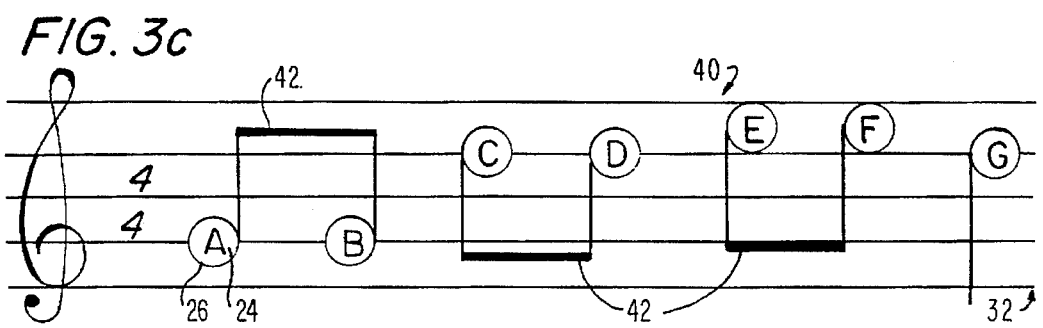

Referring to FIG. 3c, once the student is familiar with the relative position of the note corresponding to each word or syllable 24 on the standard musical staff 32, the music symbols 42 for note durations are added to the scaled melody map 30 of FIG. 3b, such as the duration symbols for whole, half, quarter, eighth, sixteenth, thirty-second, or sixth-fourth notes, to form a duration scaled melody map 40. In this fashion, a student is taught both the concept of duration of notes and the symbols for the length of those durations.

Figure 3D:
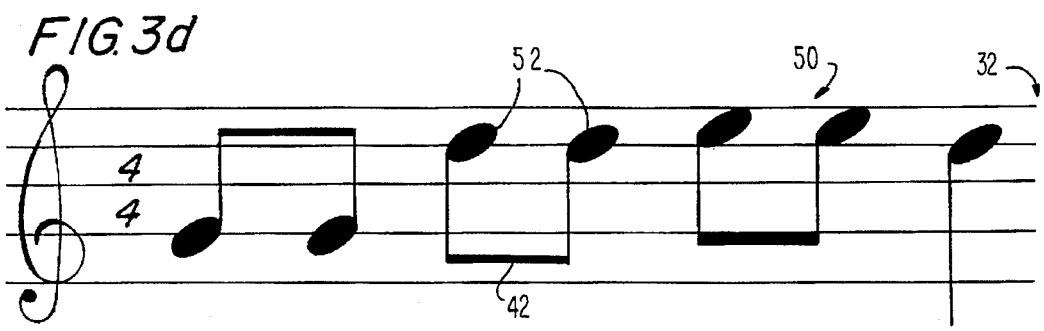

Referring to FIG. 3d, the final stage of teaching a student to read standard musical notation 50 is to eliminate the word or syllable 24 enclosed in the discrete note ovals 26 and replace them with standard musical notes 52. At this point, the student will have acquired the ability to recognize and read standard musical notation 50.

FIGS. 11a–d show the same sequential steps of teaching a student to read standard musical notation as shown in FIGS. 3a–d, but uses words and syllables 24 in the note ovals 26 corresponding to the children's song "Twinkle, Twinkle Little Star".

FIGS. 4–9 illustrate reinforcement materials which relate directly to the text which has been learned. These reinforcement materials can be used in conjunction with the visual tracking system (shown in FIG. 1), the melody maps (shown in FIG. 2), or any other embodiment of the instant invention which focuses a student's attention on each word or syllable of a readable format text such as learned song, poem, rhyme, slogan or story. Each set of reinforcement materials relates to the key words of each specific song, etc. The following examples of reinforcement materials, shown in FIGS. 4–9, are designed to allow the student to learn to read by building a sight-word vocabulary through his own efforts. The reinforcement materials shown in FIGS. 4–9 use as an example the key words of the story "Goldilocks and the Three Bears" referred to in FIG. 1.

In FIG. 4, there is shown a word search exercise 60 which is a technique to be used with the visual tracking system (shown in FIG. 1), the melody maps (shown in FIG. 2), or similar notation systems in building of sight-word vocabularies. The word search exercises 60 require the student to move through the text 14 of FIG. 1 guided by the visual cues 12, the discrete ovals 26 of FIG. 2, or similar notation system as he recites the text 14 from memory to find the word in the text matching the word in the exercise, thereby teaching himself to correlate the sound and the visual appearance of the word.

Shown in FIG. 5 is a naming and writing exercise. The naming and writing exercise 70 teaches the student to correlate the sound of the key words and their visual appearance. The naming and writing exercise 70 requires the student to recite the listed words 72 and to write the letters of the word in the spaces 74 provided. If, while working through this exercise 70, the student does not recognize a word, he can use the corresponding visual tracking system, melody map, or similar notation system to step through the story using the visual cues 12 of FIG. 1, the discrete note ovals 26 of FIG. 2, or similar notation system to find the word in the story which matches the word in the naming and writing type exercise 70. This, in turn, requires the student to develop a strategy for remembering the appearance of that word, and leads to the rapid development of sight-word vocabularies.

Figure 6:
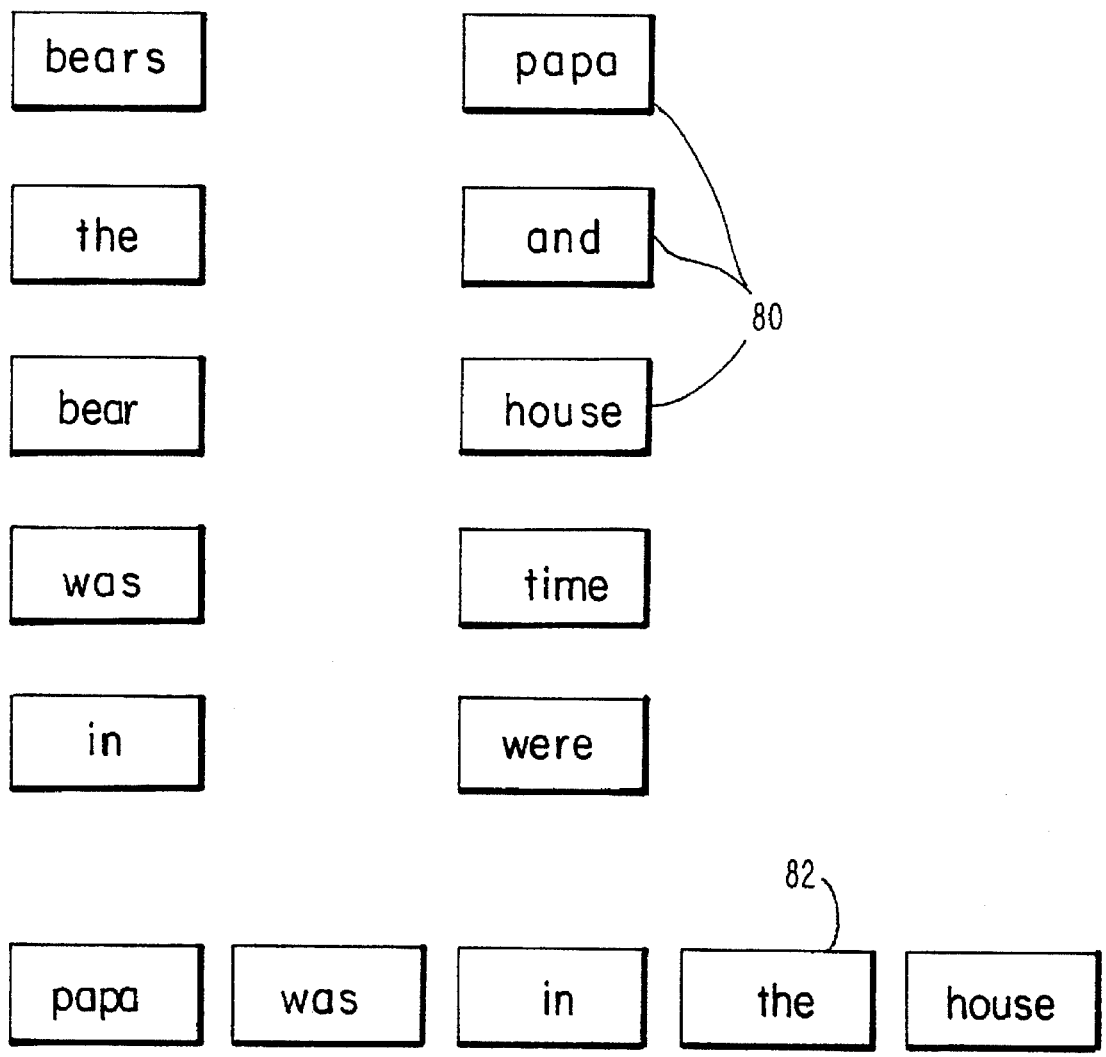
FIG. 6 represents an educational reinforcement aid defined as a word card exercise.

FIG. 6 depicts a set of word cards. The student can use a set of word cards 80 in conjunction with the readable format text to construct sentences and phrases 82 once he is proficient in recognizing some words on sight. The hands-on manipulation of the word cards 80 motivates and reinforces learning. Again, if the student does not recognize a word displayed on the word card, he can step through the corresponding readable format text using the visual cues 12 of FIG. 1, the discrete notes ovals 26 of FIG. 2, or similar notation system to find the word in the text which matches the word on the word card.

Figure 7:
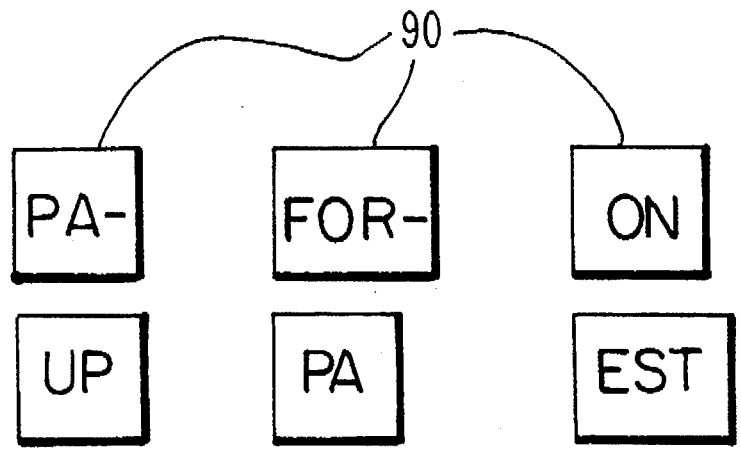
FIG. 7 represents an educational reinforcement aid defined as a syllable card exercise.
Figure 7:
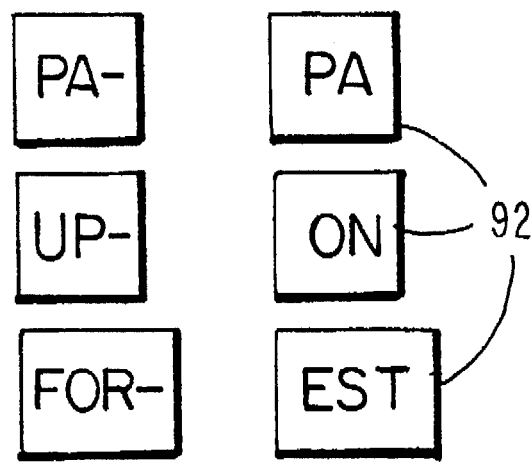

FIG. 7 depicts a set of syllable cards. The student can use the set of syllable cards 90 in conjunction with the readable format text to construct polysyllable words 92 once he is proficient in recognizing some words on sight. The hands-on manipulation of the syllable cards 90 motivates and reinforces learning of polysyllable words. Again, if the student does not recognize a syllable displayed on the syllable card, he can step through the corresponding readable format text using the visual cues 12 of FIG. 1, the discrete notes ovals 26 of FIG. 2, or similar notation system to find the syllable in the text which matches the syllable on the syllable card.

Figure 8A:
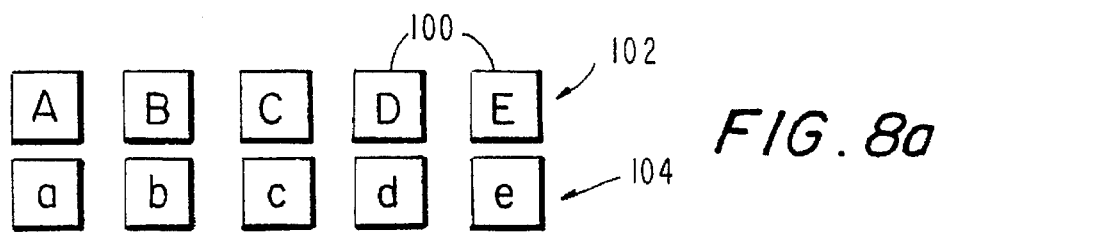
FIGS. 8a–d represents an educational reinforcement aid depicting the use of a set of alphabetic letter cards.
Figure 8B:
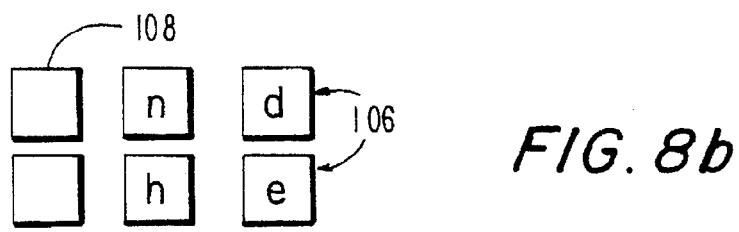
Figure 8C:
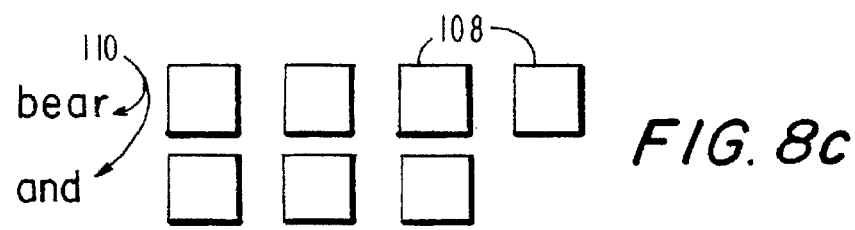
Figure 8D:
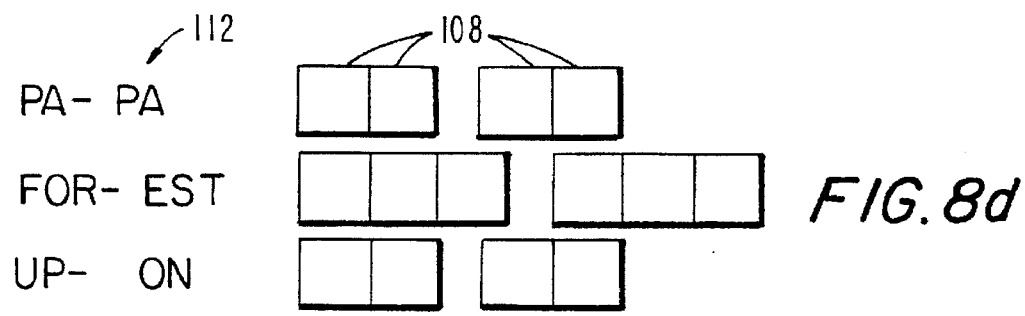

FIGS. 8a–d depict the use of a set of alphabetic letter cards. The student can use the set of letter cards 100 in conjunction with the readable format text to construct words or complete word portions. The letter cards 100 preferably have the capital letter printed on one side 102 and the corresponding small case letter on the reverse side 104, as shown in FIG. 8a. These letter cards 100 can be used to complete word portions 106 by placing an appropriate letter card 100 in a designated position 108, as shown in FIG. 8b. Additionally, these letter cards 100 can be used to construct entire words by matching the letter cards 100 to each letter in a word representation 110 and placing the letter cards 100 in their appropriate place at the designated positions 108, as shown in FIG. 8c. Moveover, the word representation can be represented with syllable indication 112 with the designated positions 108 also positioned with syllable indication, as shown in FIG. 8d. Again, the student places the letter cards 100 in their appropriate place at the designated positions 108. However, the representation of the words with syllable indication 112 and the designated positions 108 with syllable indication help the student to learn the concept of word syllables and to build polysyllable word vocabulary. This hands-on manipulation of the letter cards 100 motivates and reinforces learning, and lays the foundation for recognizing the spelling of words. Again, if the student does not recognize a word displayed on the word card, he can step through the corresponding readable format text using the visual cues 12 of FIG. 1, the discrete notes ovals 26 of FIG. 2, or similar notation system to find the word or syllable in the text which matches the word or syllable on the reinforcement materials.

FIG. 9 depicts comprehension exercises 120. The comprehension exercises 120 utilize a set of new sentences 122 created from the key words which the student has now incorporated into his sight-word vocabulary. These new sentences are used to enhance the student's ability to comprehend and use the newly learned key words in different sentence structures. Again, if the student does not recognize a word, he can step through the corresponding readable format text, to find the word in the text which matches the unrecognized word in the new sentences. The readable format text can also be used to assist in comprehending the word meaning in the new sentence structure.

After the student is taught how to use the reinforcement materials, the use of the reinforcement materials in conjunction with the readable format text permits the student to develop a strategy for remembering the appearance of each word which leads to the rapid development of sight-word vocabularies with minimal or no supervision from an educator.

It is understood that the invention is not restricted to the detailed description of the invention, which may be modified without departure from the accompanying claims.

What is claimed is:

1. An educational aid for facilitating the development of sight-word vocabularies as a foundation for reading comprehension in a student, comprising:

text having words and each word having at least one syllable, the text of which is adapted to be or is already memorized verbatim by the student and which is in readable format, said readable format text having a series of notations placed within the readable format text, each of the notations denoting each word or each syllable of each word of the readable text and each word or each syllable of the readable format text is displayed on a graphical representation depicting an analog melody pattern; and separate means, from the readable format text but adapted to be used together with the readable format text by the student, for reinforcing the sight-word vocabulary of a word or each syllable of each word contained in the readable format text the reinforcement means also being in a readable format.

2. The educational aid of claim 1 in which each of the notations in the readable format text denote each word of the readable format text.

3. The educational aid of claim 2, wherein the readable format is a song and the analog melody pattern is a series of notes of a musical staff, each word corresponding to a single note.

4. The educational aid of claim 1 or 2 further comprising means for instructing the student in memorization of the text and use of reinforcement means.

5. The educational aid of claim 1, wherein the readable format text is a song and the analog melody pattern is a series of notes of a musical staff, each word or syllable corresponding to a single note.

6. A method for developing sight-word vocabulary in a student comprising the steps of:

providing a readable format text to a student, the readable formate text being adapted to be memorized by the student or being known by the student so that the student can recite the readable format text from memory; the readable format text also being provided with a series of notations, each of the notations denoting each word or syllable of the readable format text; the readable format text also adapted to be utilized by the student by reciting each word of the readable format text from memory while following along each recited word in the readable format text by noting each successive notation in the readable format text;

providing a reinforcement exercise in a readable format adapted to be utilized together with the readable format text and relating to words or syllables included in the readable format text; and having the student recite each word or syllable of the readable format text which he can recite from memory while visually following along each successive notation corresponding to that word in the readable format text, each of the series of notations and each of the words of the written format text being displayed on a graphical representation depicting an analog melody pattern.

7. A method for developing sight-word vocabulary in a student comprising the steps of:

providing an educational aid consisting essentially of a non-syllabified readable format text and a reinforcement exercise to a student, the readable format text having words and each word having at least one syllable;

having the student recite the readable format text from memory;

providing the readable format text with a series of notations, each of the notations denoting each word or syllable of the readable format text;

having the student recite each word of the readable format text by noting each successive notation in the readable format text; and having the student practice the reinforcement exercise in a readable format relating to particular words or syllables in the readable format text by matching the particular words or syllables in the reinforcement exercise to the words or syllables in the readable format text by using sight recognition.

8. The method of claim 7, wherein each successive notation is a visual cue in the readable format text.

9. The method of claim 8, wherein the visual cue is colored to be less prominent than the print of the readable format text.

10. The method of claim 9, wherein the visual cue is a gray-shaded square placed below each word or syllable which is printed in a darker shade than that of the square.

11. The method of claim 7, wherein the steps described are repeated until the student has developed the sight-word vocabulary of substantially all of the words of the written format text.

* * * * *